May 2, 1967  KARL-ERIK FRANSSON ETAL  3,316,953
FURNITURE FITTING
Filed Sept. 22, 1964

INVENTORS
KARL ERIK FRANSSON
ANDERS LARSSON
BY Larson and Taylor
ATTORNEYS 3,316,953
FURNITURE FITTING
Karl-Erik Fransson, Vimmerby, and Anders Larsson, Vena, Sweden, assignors to C. H. Larsson, Vena, Sweden, a corporation of Sweden
Filed Sept. 22, 1964, Ser. No. 398,445
Claims priority, application Sweden, Sept. 24, 1963, 10,399/63
2 Claims. (Cl. 151—41.73)

The present invention refers to a fitting for the fixture of details in a support of wood, for instance for the fixture of a furniture leg in an underframe of a piece of furniture. Such a leg, which is provided with an iron threaded screw at one of its ends, may be screwed in fixed position into a nut, positioned inside of the fitting.

According to the invention, the fitting comprises a cylindrical sleeve, which is at least in part threaded outwardly, in the interior bore of which a shoulder is provided. Between this shoulder and a nut, which is mounted in the sleeve and threaded inwardly, axially displaceable but blocked against rotation, a disc spring is introduced.

The disc spring, preferably, should be made in the form of a conical plate spring.

Figure 1:
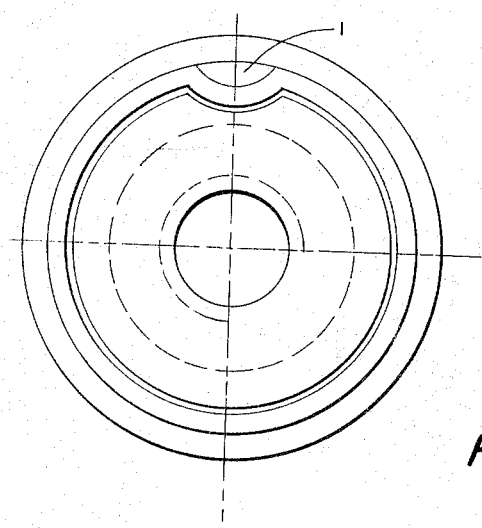
Figure 2:
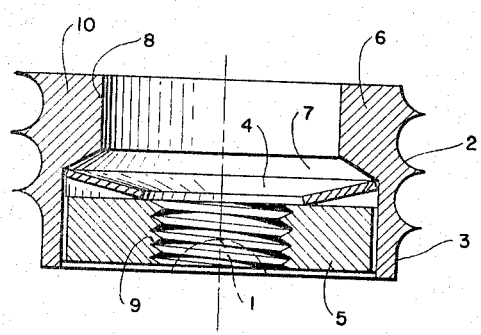

The invention will be described below in connection with the attached drawing, in which FIG. 1 shows the fitting seen from above, and FIG. 2 shows same fitting seen from the side and in cross section.

The fitting thus comprises a sleeve 6, which is outwardly in part provided with threads 2 and in part with a guide portion 3. Against a shoulder 7 in the interior of the sleeve a conical disc spring 4 presses, and spring 4 bears against a nut 5. This nut, which is threaded interiorly, corresponding to the threads on the screw, which is fixed to the leg, is axially moveable but is blocked against rotation by a recess 1 in the nut and a corresponding inwardly directed impression on the sleeve or any other attachment means on the inner side of the sleeve. These means, of course, may also be reversed, so that in stead the nut has an extension, entering into an inwardly arranged recess in the sleeve. This arrangement also serves to retain the nut 5 in engagement with the sleeve 6.

When mounting the fitting in a support of wood, for instance for the fixture of a furniture leg in the under frame of a piece of furniture, one has to turn said piece of furniture upside down, and thereafter one drills from the upper side, that is to say the future downside of the piece of furniture, a hole, which does not pass through the piece of furniture, with a diameter, corresponding to the diameter of the guide part 3 of the fitting. Thereafter the fitting is screwed into the piece of furniture, so that the upper side of the fitting is in flush with the future down side of the piece of furniture.

Hereafter the detail, which is to be attached to the support of wood, is screwed into the opening 8 in the sleeve 6 so that the threads of the screw, which may for instance be attached to a table leg, enters into the internal threading 9 inside of the nut 5. In this way the table leg is brought closer and closer to the future lower side of the table-top, or against the surface 10 on the sleeve 6, until these parts are in mutual contact. Thereafter, however, the screwing action may be continued, the nut thereby being moved still closer to the shoulder 7, simultaneously spanning the disc spring 4. It is possible to stop this screwing action at a suitable time, when there is sufficient frictional engagement between the end of the leg and surface 10 of sleeve 6 and the leg is positioned such that it stands perpendicularly to the table top and in correct relation to the piece of furniture, for instance so that, if the leg is four edged, its four sides are parallel to the sides of the piece of furniture. The height position of the leg will not vary thereby, but its length outside of the fitting will remain constant.

We claim:
1. A furniture fixture for securing a first furniture element onto a second furniture element in predetermined angular relation comprising, a sleeve, external threads on said sleeve, a shoulder internally in said sleeve, a nut in said sleeve, internal threads in said nut, means mounting said nut in said sleeve for axial movement therein, and for preventing rotation of said nut therein, and a conical disc spring disposed between the shoulder and the nut urging the nut away from the shoulder, whereby the externally threaded sleeve may be screwed into an opening in the second furniture element and the first furniture element may be screwed into the internally threaded nut to draw the nut towards the shoulder against the action of the spring and the sleeve may be turned with respect to the second furniture element so that the first and second furniture elements may be both in tight engagement with each other and in predetermined angular relationship.

2. A furniture fixture according to claim 1, wherein a portion of the external surface of the sleeve is unthreaded to provide a guide in screwing the sleeve into the second furniture element.

References Cited by the Examiner

UNITED STATES PATENTS

| | | | |
|---|---|---|---|
| 99,473 | 2/1870 | Pratt | 151—38 |
| 1,120,403 | 12/1914 | O'Leary | 151—41.73 |
| 2,634,934 | 4/1953 | Martin et al. | 151—41.73 |
| 2,639,179 | 5/1953 | Phelps | 151—41.73 |
| 2,827,097 | 3/1958 | Nuss | 151—41.73 |

FOREIGN PATENTS 653,609   5/1951   Great Britain.

CARL W. TOMLIN, *Primary Examiner.*
THOMAS F. CALLAGHAN, M. PARSONS,
*Assistant Examiners.*